Jan. 3, 1928. 1,654,591
P. KUCERA
METHOD AND APPARATUS FOR MELTING GLASS
Filed Feb. 21, 1923 2 Sheets-Sheet 1
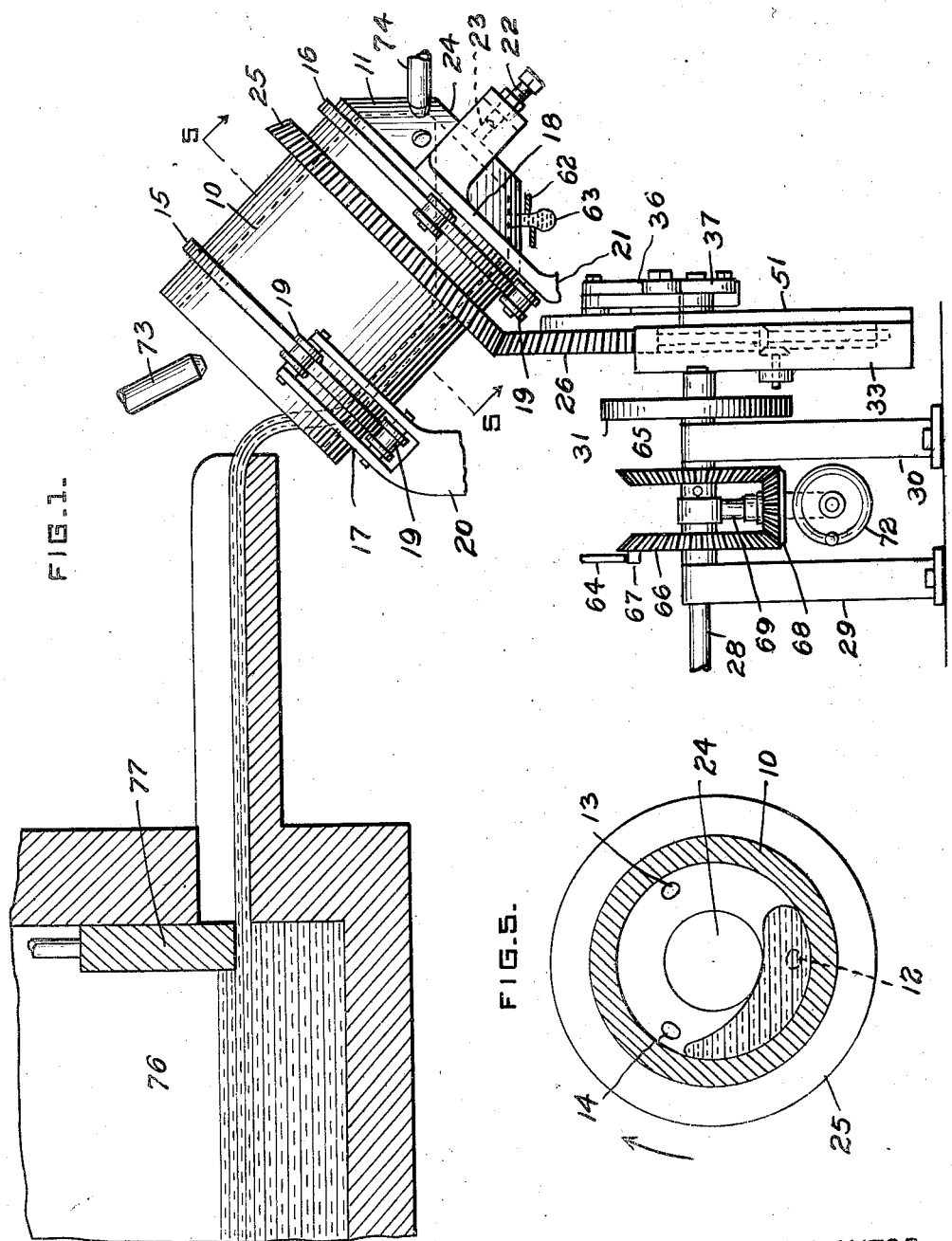
WITNESSES
J. Herbert Bradley.
INVENTOR
Peter Kucera.
By Green and McAllister
His Attorneys Jan. 3, 1928. 1,654,591
P. KUCERA
METHOD AND APPARATUS FOR MELTING GLASS
Filed Feb. 21, 1923 2 Sheets-Sheet 2
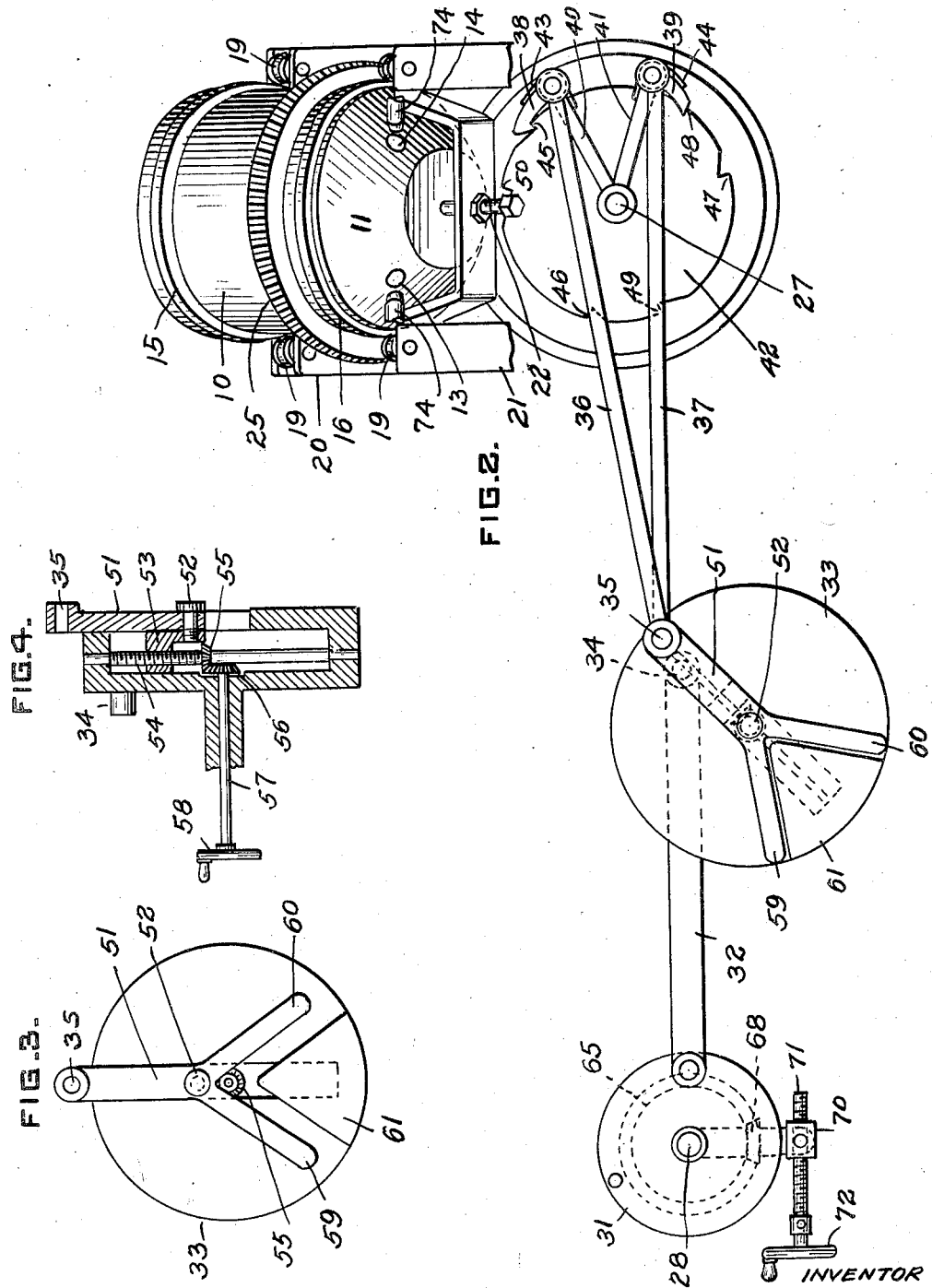
WITNESSES
J. Herbert Bradley.
INVENTOR
Peter Kucera
By Greew and McCallister
His Attorneys.

Patented Jan. 3, 1928.

1,654,591

UNITED STATES PATENT OFFICE.

PETER KUCERA, OF PITTSBURGH, PENNSYLVANIA.

METHOD AND APPARATUS FOR MELTING GLASS.

Application filed February 21, 1923. Serial No. 620,383.

The invention relates to the separation of molten glass into mold charges of uniform size and at uniform intervals of time for delivery particularly to glass shaping machines.

At present there a number of distinct methods and devices for feeding molten glass in uniform masses and at regular intervals of time for delivery to glass shaping machines. With all of these, however, with which I am familar, it is necessary to have the glass so stiff that it is not in the ideal state or condition for shaping when the time for shaping arrives.

With most of the methods and devices now in use with which I am familiar, it is necessary to have a special furnace or tank to accommodate the device or method. In those methods in which the flow of molten glass through a bottom flow orifice is controlled by means of a plunger or valve movable within the molten glass, portions of the mechanism for operating the valve or plunger are necessarily located in positions where they are subjected to intense heat, thus rendering repairs thereto difficult and slow.

None of the methods or devices with which I am familiar are adapted to feed pot or crucible glass in the form of mold charges of uniform size and at regular intervals of time.

An object of this invention is to produce a method of and apparatus for forming mold charges from molten glass which may be used in connection with any standard form of tank or furnace without changing or altering the same, and by means of which, pot and crucible glass may also be formed into uniform mold charges and delivered at uniform intervals of time.

A further object is to produce a method and apparatus by means of which hotter and therefore more fluid glass may be delivered in the form of mold charges or gobs at regular time intervals than with any of the methods or devices now in use with which I am familiar.

These, as well as other objects I attain by means of the method and apparatus described in the specification and illustrated in the drawings accompanying and forming part of this application.

In the drawings Figure 1 is a general view of an apparatus for carrying out this invention. Fig. 2 is a front view in elevation of the apparatus and Figs. 3 and 4 are detail views of portions of the apparatus. Fig. 5 is a sectional view taken on line 5—5 of Fig. 1 looking in the direction of the arrows.

Broadly the device consists of a container or reservoir mounted for intermittent rotation about an axis preferably inclined at an angle of 45° to the horizontal. Molten glass may be run into the upper open end of this container or reservoir from a furnace or tank or may be ladled into it from a pot, crucible or other melting device.

The lower end of the reservoir or container is provided with a series of gravity discharge outlets or orifices. The reservoir or container is lined with a refractory lining and a flame is directed into the reservoir to maintain the batch of molten glass therein at the desired temperature and consistency.

The mechanism for rotating the container is such that it is moved or rotated in a step by step manner, the number of steps depending upon the number of outlet orifices.

If there are three outlet orifices, the container is rotated one third of a revolution and is stopped when one of the orifices has reached its lowest point of travel; the rotation is then stopped to allow glass to flow through the bottom orifice. When the depending gob or mold charge has attained the proper size, it is severed by shears or other severing mechanism operating in synchronism with the movement of the container.

After the gob has been severed the container is again rotated another third of a revolution or until the next discharge orifice reaches the bottom of its travel. The dwell between the rotational movements may be varied and adjusted so as to regulate the size of the gob or mold charge; the larger the dwell the larger the gob will be.

The mechanism is so constructed that as the length of the dwell is changed, the time of operating the severing device is also changed.

In the specific device of the drawings the feeding device comprises a container or reservoir 10 which in the main is cylindrical. This is inclined at an angle of 45° to the horizontal and has its upper end open. The lower end is closed and is formed in the nature of a truncated cone. The conical portion 11 is provided with three discharge orifices or outlets 12, 13 and 14, equally spaced therearound.

This cylindrical container is provided with two rings 15—16 located adjacent the ends of its cylindrical surface and the container is mounted in two cradles 17—18 each provided with flanged rollers or wheels 19 between the flanges of which the rings are positioned so as to roll. The container is supported by the roller and rotated within the cradles. The cradles are mounted on suitable supports or standards 20—21 and the standard 21 carries a thrust bearing pin 22 adapted to cooperate with a pin 23 at the center of the lower closed end 24 of the container. A bevel ring gear 25 encircles the container between the rings 15 and 16 and this meshes with a bevel gear 26 mounted on horizontal shaft 27.

Bevel gear 26 is intermittently rotated by the following mechanism. Shaft 28 journaled in suitable standards 29 and 30, is adapted to be rotated by a suitable motor, (not shown) of the proper power and speed in synchronism with the glass shaping machine which it feeds a crank disc 31 and this, by means of a connecting rod 32 is connected to an oscillating disc 33. The crank pin on disc 31 is nearer the center of said disc than the crank pin 34 on disc 33, therefore as disc 31 is rotated, disc 33 is caused to oscillate.

Oscillating disc 33 on the opposite side from pin 34, carries a radially adjustable pin 35 and to this pin 35 two rods 36 and 37 are pivotally connected. Rod 36 at its outer end carries a pawl 38 and rod 37 at its outer end carries a pawl 39. The outer end of rod 36 is supported from the shaft 27 by means of a link 40 while the outer end of rod 37 is supported from shaft 27 by means of a link 41.

Pawls 38 and 39 are respectively held in engagement with the periphery of disc 42 by means of springs 43 and 44. Disc 42 which is keyed to shaft 27 is provided with two series of peripheral ratchet teeth. Pawl 38 engages teeth 45, 46 and 47 while pawl 39 engages teeth 48, 49 and 50.

Bevel gear 26 is keyed to shaft 27 and as disc 42 is rotated, gear 26, meshing with gear 25 carried by the container 10, will rotate the container. If disc 33 is given a complete oscillation to the left (Fig. 2) pawl 39 will rotate disc 42 clockwise one third of a revolution. While this is happening, pawl 38 will ride over tooth 50 and will drop in front of tooth 46. When disc 33 is given a complete oscillation to the right, disc 42, by means of pawl 38, will be rotated one third of a revolution and pawl 39 will ride over tooth 45 and will fall in front of tooth 50.

Pin 35 to which rods 36 and 37 are pivotally attached is mounted at the outer or top end of a slide 51. This slide is pivotally mounted on a pin 52 carried upon a block 53 threaded onto a screw 54 mounted for rotation within disc 33. Screw 54 at its inner end carries a bevel gear 55 which meshes with a bevel gear 56 carried by a rod 57 which in turn is provided with a hand wheel 58. From this construction it will be seen that as hand wheel 58 is rotated in one direction or the other, screw block 53 will be moved toward or away from the center of disc 33 thereby adjusting pin 42 toward or away from the center of disc 33. In this manner, the throw of rods 36 and 37 may be varied.

The inner or lower end of slide 51 is bifurcated or split into two arms 59 and 60 so positioned with relation, one to the other, as to form a triangle. A triangular stop member 61 is carried by disc 33 and is located between arms 59 and 60. As slide 51 is moved, by means of hand wheel 58, so that pin 35 moves away from the center of disc 33, the distance from arms 59 and 60 to the adjacent sides of triangular stop 61 will be increased as shown in Fig. 3. Since slide 51 is mounted to swing about pin 52, a lost motion connection between disc 33 and pin 35 to which rods 36 and 37 are connected is formed.

This lost motion or rather the amount of lost motion determines the dwell of container 10 or rather the time between its periods of rotational movement. Thus by adjusting pin 35 toward or away from the center of disc 33, the size of the gobs or mold charges of glass issuing from the bottom flow orifice of the container may be regulated. The greater the amount of lost motion, the longer will be the dwell of the container and therefore the greater the size of the gob.

Shears or other severing mechanism diagrammatically shown at 62, Fig. 1, are positioned below container 10 so as to sever the depending gob 63 at the proper time with relation to the necking in of the gob. This severing mechanism may be of any desired construction and will be connected up to a suitable trip device 64 so as to be tripped at the proper time with relation to the formation of the gob and therefore with relation to the movements of the container 10.

In order to properly time the operation of the shears or severing mechanism, I have provided a device which comprises a bevel gear 65 pinned or otherwise secured to shaft 28, a corresponding but oppositely positioned bevel gear 66 loosely mounted on shaft 28, and carrying a pin 67 adapted during the rotation of gear 66 to contact with and move trip device 64 to operate the shears. A bevel gear 68 carried by a stub shaft 69 loosely supported from shaft 28 meshes with gears 65 and 66 and rotates gear 66 in the opposite direction from gear 65. The lower end of stub shaft 69 is operatively connected to a screw block 70 threaded onto a screw 71 having at one end a hand wheel 72. By adjusting hand wheel 72, gear 68 will be swung about shaft 28 and in so doing will shift gear 66 with relation to gear 65 thereby causing pin 67 to change its position with relation to gear 65. It will, therefore, be seen that by means of this device, the time of operating the shears or severing mechanism with relation to the movement of container 10 may be varied and adjusted.

A suitable gas jet or other burner 73 is arranged to direct a heating flame into the top of container 10 so as to maintain the glass therein at the proper temperature and consistency. Gas jets 74 (only one of which is shown) are positioned so as to direct flames against the orifices when they reach their stop position above the level of the molten glass within the container, so as to melt off any threads that may adhere to the walls of the orifices.

The batch of glass within the container will, during the rotation of the container assume substantially the shape illustrated in Fig. 5, and during rotation of the container is kneaded or rolled upon itself and in this manner is improved.

In Fig. 1, I have illustrated the device in connection with a tank 76 and glass is shown flowing from the tank to the container. The flow of glass is controlled by means of a valve or gate 77 which will preferably be hand manipulated.

It will be understood that pot or crucible glass, or glass derived from any suitable source may be used. Glass of two or more colors may be simultaneously placed within the container and unusual results obtained in the manufacture of marbles or other articles.

Having thus described my invention, what I claim is:—

1. The method of forming mold charges, which consists in continuously rolling a batch of molten glass to periodically submerge a flow orifice formed in a confining wall, and periodically feeding predetermined quantities of glass from the batch through said orifice.

2. The method of delivering mold charges from a mass of molten glass, which consists in moving a mass of molten glass to periodically submerge a flow orifice formed in a confining wall, delivering a gob of glass from said mass through said orifice while said mass is moving across said orifice, severing the gob so delivered while suspended from said orifice and moving said mass to uncover said orifice.

3. The method of delivering mold charges of molten glass from a mass of molten glass which consists in moving a mass of molten glass over a flow orifice formed in a confining wall, delivering glass from said mass through said orifice while said mass is moving across said orifice, severing a mold charge from the glass so delivered and retracting the stub through the orifice by the movement of the adjacent portion of the mass across the orifice.

4. The method of forming mold charges of molten glass, which consists in rolling a batch of molten glass to periodically submerge a flow orifice formed in a confining wall and delivering successive quotas of molten glass from different parts of said batch through said orifice and while said orifice is submerged.

5. The method of forming mold charges of molten glass, which consists in rolling a batch of molten glass in one direction to periodically submerge a succession of flow orifices and delivering successive quotas of molten glass from different parts of said batch through said orifices.

6. The method of forming mold charges of molten glass, which consists in rolling a batch of molten glass, periodically delivering suspended gobs of molten glass from said batch and severing the gobs from the batch while said batch is rolling.

7. The method of forming mold charges of molten glass, which consists in rolling a batch of molten glass in one direction, periodically delivering suspended gobs of molten glass from said batch, severing the gobs from the batch and retracting and reincorporating the severed stubs in said batch by the rolling action thereof.

8. The method of forming mold charges of molten glass, which consists in rolling a batch of molten glass in one direction, delivering successive quotas of molten glass from different parts of said batch, severing the quotas from the batch and retracting and reincorporating the severed stubs in said batch by the rolling action thereof.

9. A method of delivering mold charges from a mass of molten glass which consists in causing the mass of glass to roll over a flow orifice, severing a mold charge from the quota of glass issuing from said mass through said orifice and rolling the mass away from said orifice to retract the severed stub and reincorporate it in said mass.

10. The method of delivering mold charges of molten glass which consists in causing a mass of glass to submerge and move across a flow orifice formed in a confining wall, delivering a mold charge from said mass through said orifice and continuing the movement of said mass across said orifice in the same direction after the delivery of said mold charge.

11. The method of delivering mold charges of molten glass which consists in causing a mass of molten glass to periodically submerge and move across a flow orifice, delivering glass from said mass through said orifice, severing a mold charge from the glass so delivered while suspended from said orifice and continuing the movement of said glass across the orifice in the same direction after said severing operation.

12. The method of delivering mold charges of molten glass which consists in causing a molten mass to periodically submerge and move across a flow orifice, delivering a portion from said mass through said orifice, severing a mold charge from the portions so delivered and continuing the movement of said mass in the same direction to retract the severed stub into said orifice.

13. A method of delivering mold charges which consists in moving a batch of molten glass over a flow orifice, delivering a quota of glass from said mass through said flow orifice, severing a mold charge from said quota and retracting the stub into the orifice by moving said mass away from said orifice.

14. The method of forming mold charges of molten glass, which consists in segregating a batch of molten glass, rolling said batch in one direction to submerge a succession of flow orifices and delivering successive quotas of molten glass from different parts of said batch through said flow orifices.

15. The combination in a glass feeding mechanism, of an inclined perforated surface, means for supplying a batch of molten glass to said surface, means for moving said surface so as to cause said glass to roll along said surface and over the perforations thereof so as to feed mold charges of glass through said perforations.

16. The combination in a glass feeding mechanism of a container, means for supplying a batch of molten glass into one end of said container, means for rotating said container in the same direction to periodically deliver glass through an outlet formed in said container and means for severing a quota of glass from the glass so delivered.

17. The combination in a glass feeding mechanism, of means for segregating a batch of molten glass, a perforated surface, means for rolling said segregated batch over said perforated surface so as to periodically deliver successive quotas of molten glass from different portions of said batch through successive perforations of said surface.

18. The combination in a glass feeding mechanism, of a hollow inclined container having perforations adjacent one end thereof, means for feeding molten glass into the upper end of said container, means for controlling the temperature of the glass within said container, and means for intermittently rotating said container in one direction so as to periodically deliver suspended gobs of molten glass from different parts of the batch through said perforations.

In testimony whereof, I have hereunto subscribed my name this 14th day of February, 1923.

PETER KUCERA.